United States Patent [19]

Kulakowski et al.

[11] Patent Number: 5,566,077
[45] Date of Patent: Oct. 15, 1996

[54] MEDIA AND OPTICAL DRIVE OPERATING TEMPERATURE CONTROL SYSTEM AND METHOD

[75] Inventors: John E. Kulakowski; Rodney J. Means, both of Tucson, Ariz.

[73] Assignee: International Business Machines Corporation, Armonk, N.Y.

[21] Appl. No.: 479,251

[22] Filed: Jun. 7, 1995

Related U.S. Application Data

[63] Continuation of Ser. No. 889,900, May 29, 1992, abandoned.

[51] Int. Cl.$^6$ .................................................. G06F 13/10
[52] U.S. Cl. ........................... 364/480; 364/184; 369/19; 369/53; 360/97.02
[58] Field of Search ..................................... 364/480, 184

[56] References Cited

U.S. PATENT DOCUMENTS

| | | | |
|---|---|---|---|
| 3,735,219 | 5/1973 | Kahn et al. | 318/135 |
| 4,056,831 | 11/1977 | Godbout et al. | |
| 4,179,732 | 12/1979 | Khan et al. | 395/275 |
| 4,470,092 | 9/1984 | Lombardi | 361/2.3 |
| 4,547,826 | 10/1985 | Premerlani | 361/25 |
| 4,685,303 | 8/1987 | Branc et al. | |
| 4,689,698 | 8/1987 | Ishikawa et al. | 360/69 |
| 4,695,994 | 9/1987 | Steenbergen et al. | |
| 4,796,142 | 1/1989 | Libert | 361/23 |
| 4,831,476 | 5/1989 | Pisczak | |
| 4,839,754 | 6/1989 | Gami et al. | 360/73.01 |
| 4,879,705 | 11/1989 | Aoyagi et al. | 369/32 |
| 4,884,162 | 11/1989 | Ito et al. | 361/2.3 |
| 5,025,267 | 6/1991 | Schofield et al. | 346/1.1 |
| 5,057,962 | 10/1991 | Alley et al. | 361/24 |
| 5,101,315 | 3/1992 | Ishikawa et al. | 361/24 |
| 5,161,073 | 11/1992 | Gami et al. | 360/73.03 |
| 5,184,025 | 2/1993 | McCurry et al. | 364/431.11 |
| 5,249,141 | 9/1993 | Vandebroek et al. | 364/557 |
| 5,249,172 | 9/1993 | Hagihara et al. | 369/54 |

OTHER PUBLICATIONS

D. K. DeSilva and N. Timko; "Thermistor–Type Temperature Monitoring Circuit", *IBM Technical Disclosure Bulletin*, vol. 17 (7) Dec. 1974.
J. C. Davy and M. J. Hughes, "Temperature Controlled Disk Actuator", IBM Technical Disclosure Bulletin, vol. 19(9), Dec. 1976.

*Primary Examiner*—Emanuel T. Voeltz
*Assistant Examiner*—Kyle J. Choi
*Attorney, Agent, or Firm*—Benman, Collins & Sawyer

[57] ABSTRACT

A control system for dynamically regulating an operating condition of a device used with and controlled by a host computer system. The inventive system includes a sensor arrangement for detecting the desired operating condition of the device and providing a signal in response thereto. A control system dynamically regulates the operation of the device in response to commands generated by the host system and the sensor output signal to maintain the operating condition of the device within predetermined parameters. In a particular implementation, the advantageous teachings of the present invention are incorporated in an optical drive system. One or more sensors are used to detect the operating temperature of the drive and provide an analog output signal in response thereto. The signal is digitized and input to a microprocessor based control circuit. When the temperature of the drive exceeds a first threshold, the control circuit dynamically adjusts the duty cycle of the drive by inhibiting high temperature write and erase operations. When the temperature of the drive exceeds a second threshold, the control circuit inhibits the lower temperature read and verify operations as well. As a result, the controller maintains the operating temperature of the drive within predetermined parameters which may be controlled by the user through the host computer.

31 Claims, 4 Drawing Sheets

FIG. 7

```
         ┌──────────────┐
         │ SET POWER ON │
    120—│    TO ONE    │
         └──────┬───────┘
                │
         ┌──────▼──────────────┐
   124—│ SET ALL MODE FIELDS │
         │ TO DEFAULT VALUES   │
         │ SET MODE CONTROL    │
         │ TO ZERO             │
         └─────────────────────┘
```

FIG. 8

```
        ┌─────────┐
  130—│ RECEIVE │
        │   CMD   │
        └────┬────┘
             │
        ╱────▼────╲        ┌─────────────────────┐
       ╱  MODE    ╲  YES  │ SET TEMP AND DELAY  │
  132—│  SET CMD  │──────▶│ VALUES AND MODE     │—133
       ╲    ?     ╱        │ CONTROL BIT ON      │
        ╲───┬────╱         └──────────┬──────────┘
            │ NO                      │
            │                         │
        ╱───▼────╲         ┌──────────┐
       ╱  MODE   ╲   NO   │   USE    │—141
  140—│ CONTROL  │───────▶│ DEFAULT  │
       ╲ BIT ON  ╱         │  VALUES  │
        ╲   ?   ╱          └────┬─────┘
         ╲─┬───╱                │
           │ YES                │
        ┌──▼──────────┐         │
        │  USE MODE   │—141B   │
        │ SET VALUES  │         │
        └──────┬──────┘         │
               │                │
               ▼                ▼
        ┌─────────────┐
        │   EXECUTE   │—142
        │     CMD     │
        └──────┬──────┘
               │
        ┌──────▼──────┐
        │   REPORT    │—134
        │    FINAL    │
        │   STATUS    │
        └─────────────┘
```

MEDIA AND OPTICAL DRIVE OPERATING TEMPERATURE CONTROL SYSTEM AND METHOD

This is a continuation of application Ser. No. 07/889,900, filed May 29, 1992 now abandoned.

BACKGROUND OF THE INVENTION

1. Field of the Invention

The present invention relates to computer equipment and peripherals. More specifically, the present invention relates to temperature control mechanisms for peripheral devices and the like for computer equipment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Heat generated by computers and associated devices may be problematic under certain environmental and operational conditions. As a result, heat dissipation is an important design consideration in the properly engineered system.

Heat is generated in the typical personal computer system by the computer and the associated peripheral devices. Packaging constraints and unique operating conditions make the heat generated by one peripheral, the optical drive, particularly problematic.

Recent technological advances have opened the door to widespread use of optical drives as attractive alternatives for off-line information storage and retrieval. For example, rewritable optical drives have recently been introduced which offer substantially increased storage capacity, 128 and 325 Megabytes per side for the 3½ and 5¼ inch drives, respectively, as compared to conventional hard disk drive systems which offer up to 80 to 100 Mbytes per side.

Rewritable optical drive systems typically include an optical media consisting of a magneto-optic material, e.g., a thin film layer of ferrous-oxide or other suitable material, vapor deposited on a substrate of plastic or glass. A laser beam is directed onto the media for read, write, erase and verify operations. The media is driven by a motor and spindle arrangement. For write and erase operations, a high intensity beam is directed onto the media at storage locations determined by a carriage and a fine tracking and focus lens mounted in a deflection coil. The carriage is driven by an actuator coil.

An electromagnetic or bias coil is positioned by the carriage below the media at a storage location at which a write or erase operation is desired. As the beam heats the media above the Currie point, the magnetic orientation of the area illuminated by the beam is set in accordance with the orientation of a magnetic field generated by the bias coil. When the high intensity beam is removed, the spot cools below the Currie point and the magnetic field orientation thereof is fixed.

During subsequent read and verification operations, a low intensity beam is directed on a given storage location and is reflected in accordance with the magnetic field orientation thereof. This causes a slight rotation in the polarization of the reflected beam which is detected and output as the information stored at the addressed location.

It is well known in the art that a considerable amount of heat is generated in the bias and actuator coils during the high intensity write and erase operations. In addition, heat is generated by the illumination of the media by the high intensity laser beam. Heat is also generated by driver circuits for the laser and the bias and actuator coils as well as other electronic circuitry in the system.

Unfortunately, operation of the drive media is typically adversely affected by high temperatures, i.e., temperatures in excess of 55° C. Thus, although the other components may operate at temperatures up to 100° C., there has been an ongoing effort in the art to address the heat issue.

One conventional approach to the heat problem involved the separation of the drive components and the location of the separated components at a spacing sufficient to allow for adequate cooling. However, this approach became impractical as the form factor (packaging) constraints became more demanding. That is, it has been recognized as desirable to have an optical drive and associated circuitry that fit into the space allocated in a personal system for conventional disk drive systems. This minimizes the spacing between components and inhibits cooling for the form factor for the 5¼ inch drive and is especially acute for the form factor for the 3½ inch drive.

Some systems use fans to force increased airflow through the drive. Unfortunately, fans also contaminate the drive with dust and other debris.

Heat conduction mechanisms have been used, but have been found to be limited by low energy transfer rates due to silicon thermal isolation between components.

Other conventional approaches to the heat problem have included: 1) the use of components with greater temperature margins, 2) a decrease in the current demands of the system with a greater circuit integration and/or use of more efficient components, and 3) a decrease in the performance of the system to reduce energy demands. The first option adds to the cost of the system and places that cost on all users regardless of the environmental conditions in which their systems operate. The second option also adds to the cost of the system and the third option is generally considered to be undesirable.

Thus, a need remains in the art for an inexpensive system and/or technique for addressing the heat generation problem associated with computer peripherals in general and tightly packaged optical drives in particular.

SUMMARY OF THE INVENTION

The need in the art is addressed by the present invention which provides a control system for dynamically regulating an operating condition of a device used with and controlled by a host computer system. The inventive system includes a sensor arrangement for detecting the desired operating condition of the device and providing a signal in response thereto. A control system dynamically regulates the operation of the device in response to commands generated by the host system and the sensor output signal to maintain the operating condition of the device within predetermined parameters.

In a particular implementation, the advantageous teachings of the present invention provide an improved optical drive system. One or more sensors are used to detect the operating temperature of the drive and provide an analog output signal in response thereto. The signal is digitized and input to a microprocessor based control circuit. When the temperature of the drive exceeds a first threshold, the microprocessor dynamically adjusts the duty cycle of the drive by inhibiting high temperature write and erase operations. When the temperature of the drive exceeds a second threshold, the control circuit inhibits the lower temperature read and verify operations as well. As a result, the controller maintains the operating temperature of the drive within predetermined parameters which may be controlled by the user through the host computer. Many options are disclosed for inhibiting the operation of the drive. A particularly novel feature of the invention is the use of current through the bias coil of the drive to detect the operating temperature thereof. In any event, the invention allows the drive to be used without performance impact in normal office environments and machine configurations and enables the machine to cope with harsh temperature environments without putting the cost of engineering temperature extremes on all users.

Thus, the invention provides an inexpensive system and technique for addressing the heat generation problem associated with computer peripherals in general and tightly packaged optical drives in particular.

BRIEF DESCRIPTION OF THE DRAWINGS

FIG. 7 is a flow chart which illustrates operations for setting "disk in" and "mode" controls for the optical drive of the present invention.

FIG. 8 is a second flow chart which illustrates the automatic operation of the optical drive of the present invention.

DESCRIPTION OF THE INVENTION

Illustrative embodiments and exemplary applications will now be described with reference to the accompanying drawings to disclose the advantageous teachings of the present invention.

Figure 1:
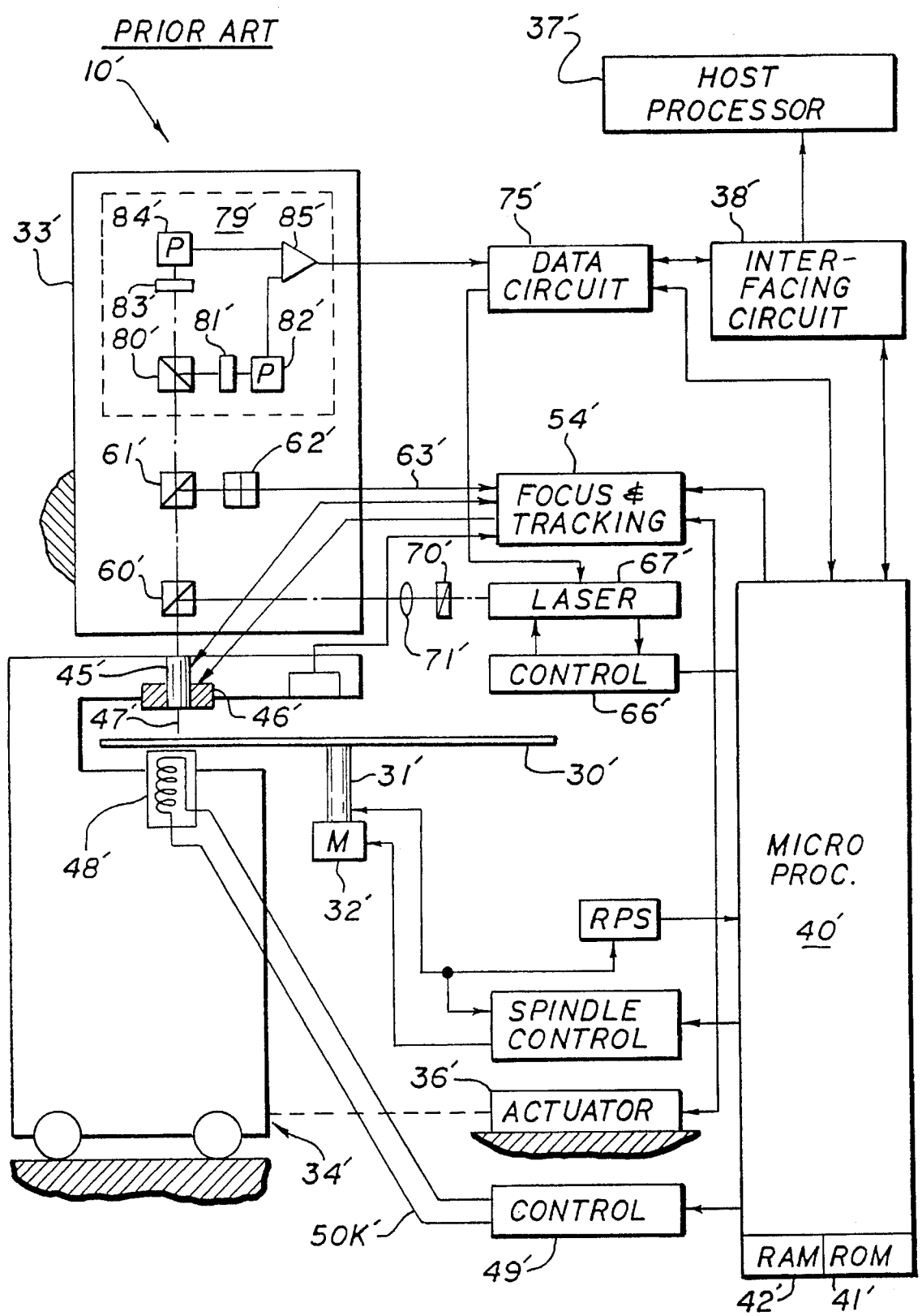
FIG. 1 is a simplified block diagram of a conventional rewritable optical drive system.

FIG. 1 shows an optical drive system constructed in accordance with conventional teachings. This system is shown and disclosed in U.S. Pat. No. 4,939,598, issued Jul. 3, 1990 to J. E. Kulakowski et al., the teachings of which are incorporated by reference herein. The drive system 10' includes a disk 30' of magneto-optic media consisting, for example, of a vapor deposited thin-film layer of ferrous-oxide on a plastic substrate. The magneto-optic layer may be an alloy of rare earth and transitional metals as taught by Chaudhari et al., in U.S. Pat. No. 3,949,387. The disk 30' is mounted for rotation on a spindle 31' by a motor 32'.

Data is written to and read from the disk 30' by a beam of light provided by a laser 67'. The beam is radially positioned and focused by elements provided on a head 33' and a carriage 34'. That is, the beam is polarized by a polarizer 70', collimated by a lens 71', reflected by a half-silvered mirrored grate 60' on the head 33' and focused onto the disk 30' by a lens system 45' on the carriage 34'. Coarse positioning of the carriage 34 is provided by the drive microprocessor 40' via the coarse actuator 36'. Fine positioning of the beam is achieved by an actuator coil 46'. By controlling the motor 32' and the positioning elements, individual storage locations on the disk 30' may be accessed by the laser 67'.

Position sensing is achieved by analyzing light reflected from the disk 30'. Light reflected off a Land and Groove pattern embossed on the disk 30' travels over the path 47', through the lens 45' and a first one-half mirror 60', off a second one-half mirror 61' onto a quadrature detector 62'. The quadrature detector 62' has four photodetectors which supply signals on four lines collectively denominated by numeral 63' to a focus and tracking circuit 54'. Focusing and tracking are achieved by comparing the light intensities detected by the four photodetectors in the quadrature detector 62'.

At storage locations at which a write or erase operation is desired, the intensity of the laser beam is increased to a high level by a control circuit under command of a drive microprocessor 40'. The laser beam heats the illuminated spot on the disk to a temperature above the "Currie" point. As is known in the art, in accordance with the "Kerr effect", the heating of the spot enables a bias coil 48' to direct the magnetic field of the disk 30' at the spot to a desired orientation. As the spot cools below the Currie point, it holds this orientation and thus, data is stored or erased.

In FIG. 1, the coil 48' is oriented in a "write" direction in which binary ones, for example, are recorded on the disk 30'. To erase the disk 30', the bias coil 48' is energized so that the opposite pole is adjacent to the disk 30'.

To read the disk, the intensity of the beam is reduced to a read power level and the desired track is accessed. At locations at which data is stored, the polarization of the beam is changed by the remnant magnetization at that location as it is reflected from the disk 30'. At locations where no data is stored (erased) the remnant magnetization is in the opposite direction. The polarization modulated beam is passed by the first and second half mirrors or grates 60' and 61' to a beamsplitter 80'. The beamsplitter 80' divides the beam into two separate beams and directs these separated beams to second and third polarizers 81' and 83', respectively. One polarizer passes light that has been reflected by the disk where data has not been recorded while the other polarizer passes light reflected from the disk where data has been recorded. Light passed by each polarizer is detected by an associated photodetector 82 and 84. A differential comparator 85' compares the outputs of the photodetectors 82 and 84 and provides a signal to a data circuit 75' for detection. Electrical data corresponding to the data stored at the accessed storage location is provided by the data circuit 75' to a host processor 37' via an interfacing circuit 38' under control of the drive microprocessor 40'.

As mentioned above, a considerable amount of heat is generated in the bias coil 48' during the high intensity write and erase operations. In addition, heat is generated by the illumination of the disk media by the high intensity laser beam. Heat is generated by the laser 67', laser driver circuits 66', via coil driver circuits 49', and actuator coils 36' and 46', and actuator coil drivers 54' as well as other electronic circuitry in the system.

Unfortunately, recording reliability and operation of the disk media are typically adversely affected by high temperatures, i.e., temperatures in excess of 55° C. Thus, although the other components may operate at temperatures up to 100° C., the heat sensitivity of the media has been a critical limit with respect to the heat generation problem.

The present invention addresses this problem by providing a control system for dynamically regulating the duty cycle of the drive to control the temperature thereof. One or more sensors are used to detect the operating temperature of the drive and provide an analog output signal in response thereto. The signal is digitized and input to a microprocessor based control circuit. When the temperature of the drive exceeds a first threshold, the control circuit dynamically adjusts the duty cycle of the drive by inhibiting high heat generating write and erase operations. When the temperature of the drive exceeds a second threshold, the control circuit inhibits the lower heat generating read and verify operations as well. As a result, the controller maintains the operating temperature of the drive within predetermined parameters which may be controlled by the user through the host computer.

Figure 2:
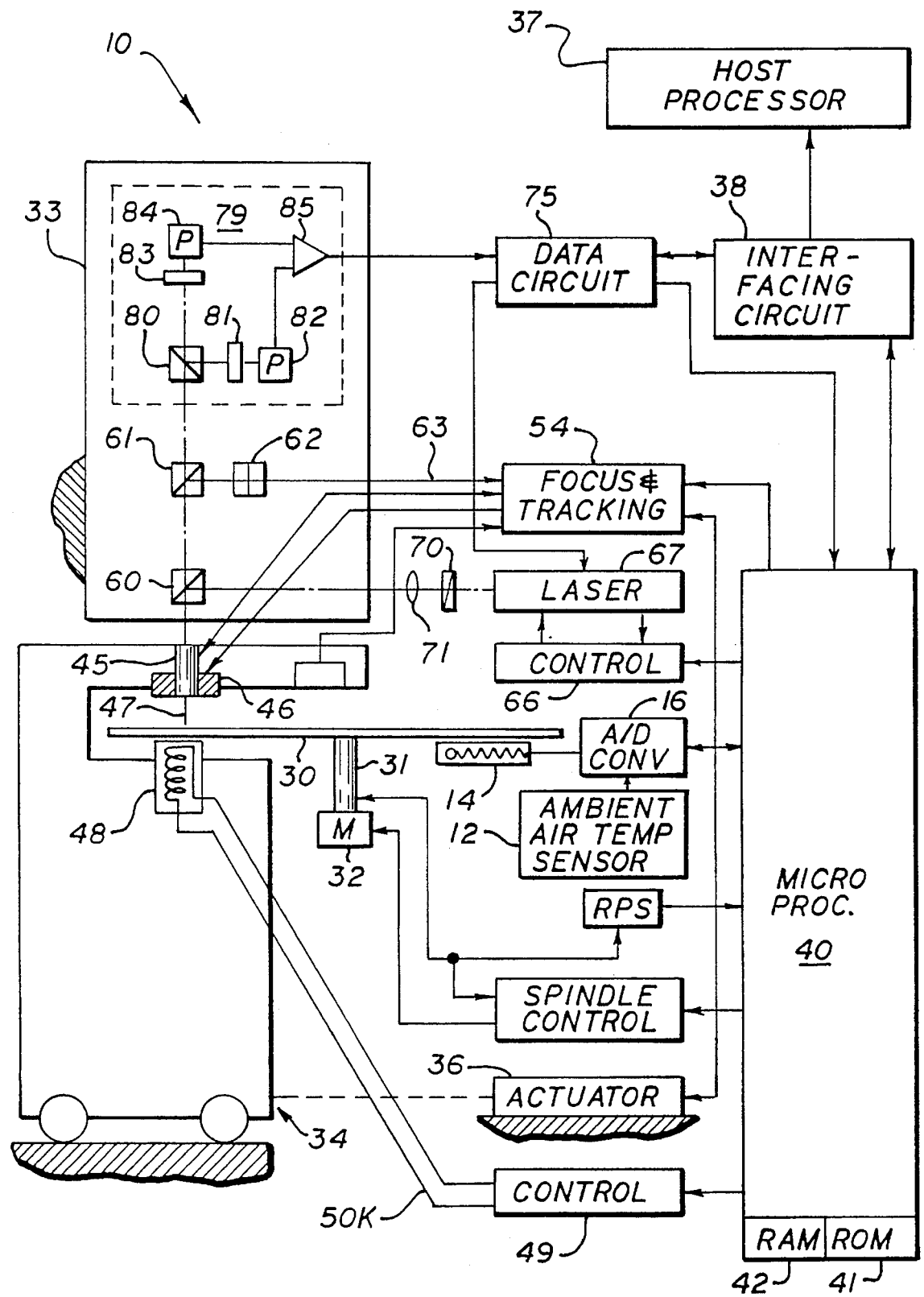
FIG. 2 is a simplified block diagram of a rewritable optical drive system 10 incorporating the teachings of the present invention.

FIG. 2 is a simplified block diagram of a rewritable optical drive system 10 incorporating the teachings of the present invention. The inventive temperature control system includes the components of the conventional system of FIG. 1 with the addition of first and second temperature sensors 12 and 14, and an analog to digital converter 16. The first sensor 12 is an ambient air temperature sensor and may be of any design suitable for a given operational environment.

Figure 3:
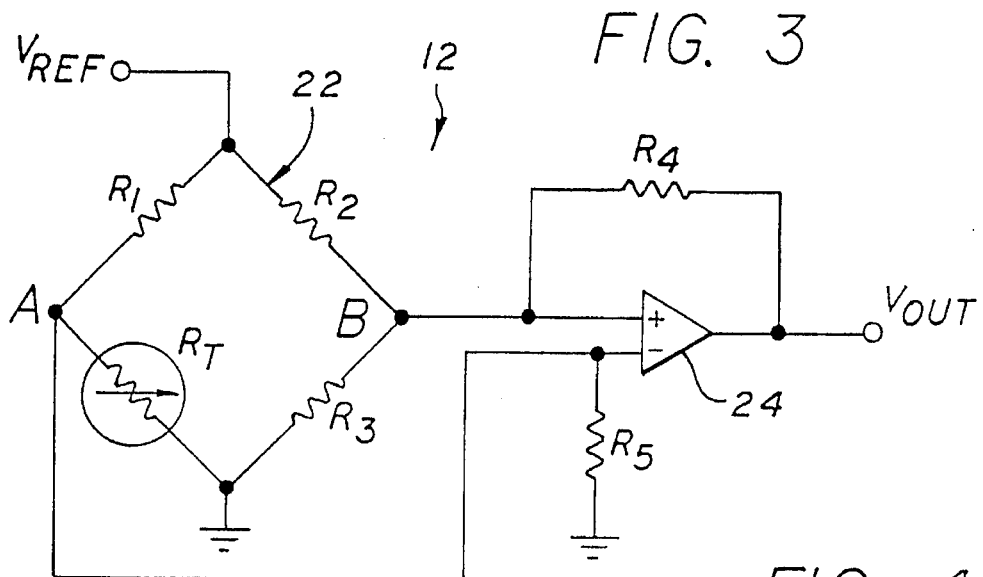
FIG. 3 shows an illustrative implementation of the ambient air temperature sensor.

FIG. 3 shows an illustrative implementation of the ambient air temperature sensor 12. The sensor 12 includes a bridge 22 and an operational amplifier 24. The bridge 22 consists of three fixed resistors $R_1$, $R_2$, $R_3$ and a thermistor $R_T$. The three fixed resistors $R_1$, $R_2$, and $R_3$ have a resistance R and the thermistor $R_T$ has a resistance of $R(1+\alpha)$ where $\alpha$ is a known temperature sensitive variable.

The negative input of the operational amplifier 24 is connected to a first node of the bridge 22, node "A", between the first resistor $R_1$ and the thermistor $R_T$. The positive input of the operational amplifier 24 is connected to a second node of the bridge 22, node "B", between the second and third resistors $R_2$ and $R_3$. A fourth resistor $R_4$ is connected between the positive input and the output of the amplifier 24. A fifth resistor $R_5$ is connected between the negative input of the operational amplifier and ground. The fourth and fifth resistors $R_4$ and $R_5$, respectively, have a resistive value of $R_{ref}$, such that the output of the sensor 12 $V_{out}$ is given by the relation:

$$V_{out} = \alpha V_{ref} R_5 / 2R(1+\alpha) \quad [1]$$

where $R_{ref} \gg R$. Thus the temperature may be determined by measuring $V_{out}$ and solving for $\alpha$:

$$\alpha = [2RV_{out}/V_{ref}R_5] / [1 - (2RV_{out}/V_{ref}R_5)] \quad [2]$$

Figure 4:
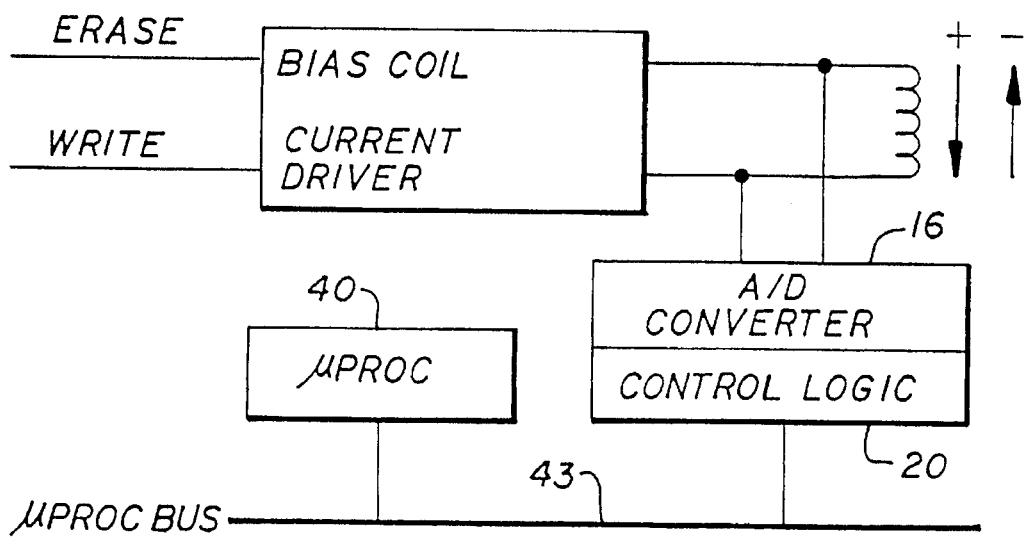
FIG. 4 is an illustrative implementation of a temperature sensing arrangement in accordance with the teachings of the present invention.

In the alternative, the ambient air temperature may be sensed from the bias coil 48 or the actuator coil located in the actuator block 36 directly as illustrated in FIG. 4. In the implementation of FIG. 4, the voltage across the bias coil is measured at the input to the analog to digital converter 16. Optional control logic 20 may be used to facilitate addressing of individual sensors each connected to a separate analog to digital converter.

Returning to FIG. 2, the media temperature sensor 14 may be a conventional temperature sensor. The sensor outputs are digitized by the analog to digital converter 16 and input to the microprocessor 40. As discussed more fully below, the microprocessor 40 is programmed to utilize the temperature data from the sensors to control the duty cycle of the drive and thereby regulate the operating temperature thereof.

In operation, during initial power-on of the drive, the default values of the operating temperatures and the idle value (or polling rate) are set by microcode as discussed below. When the host sends a Mode Select command, the default values are replaced by values in the command. This allows the temperature values and timer/polling values to be changed by the host computer. Before the initiation of a read, write, or erase command, the microcode in the microprocessor 40 interrogates the temperature value from one or more of the temperature sensors through the analog to digital converter 16. In the alternative, the microprocessor 40 may receive an interrupt when the selected temperature has been exceeded.

The invention allows for several modes of operation depending on the measured temperature relative to several temperature thresholds. In the illustrative mode of operation, if a first temperature value is exceeded and a write or erase command (which includes a seek) has been initiated by the host processor 40, the microcode initiates and executes the command but delays returning a "command completed" signal to the host processor 37 until the timer value has been reached. The same is true for a seek command followed by a write or erase command. In the alternative, the temperature sensors could be polled to determine if the operation can proceed in place of the "idle" timer. In a third alternative, the microprocessor can be interrupted if the operation can proceed. In either implementation, the drive is allowed to cool without inhibiting the execution of read commands which are low heat generators. The operation of the host processor 37 would not be affected as the drive 10 would appear to be in the process of executing a command and busy.

If a second operational temperature threshold has been exceeded and a read, seek, write, or erase command (which includes a seek) has been initiated, the microcode initiates and executes the command but delays returning the command complete signal to the host until the "idle" timer value expires. This allows the drive to cool after execution of read commands as well. Again, the operation of the host would not be affected as the drive would appear to be in the process of executing a command and busy.

At the expiration of the timer value or via polling the temperature sensor for an acceptable value or after an interrupt, the drive returns the command complete signal to the host and normal operation continues until the temperature values are again exceeded.

Figure 5:
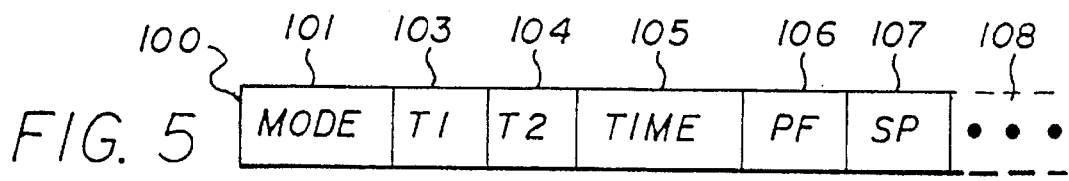
FIG. 5 illustrates a mode setting command for use in conjunction with the present invention.

FIG. 5 illustrates a mode setting command for use in connection with the present invention. The command 100 includes an operation code field 101 which indicates that the command is a "mode set" command. A second field T1 103 indicates the value of the first operating temperature. The second operating temperature T2 is in the third field 104. The fourth field 105 provides the timer delay value. The fifth field 106 is the page format bit which is set to one to indicate that data sent in the mode select command uses a so-called page format. A sixth field 107 is a save parameter bit which is set to zero (inactive) which indicates that the optical disk drive of FIG. 2 shall not save the pages sent during a data out phase to the drive. The final field 108 identifies an ellipsis indicating that a mode set command may contain other controller information for use by the drive. Other fields contained in the Mode Set command are omitted as they are not required for understanding the invention.

Figure 6:
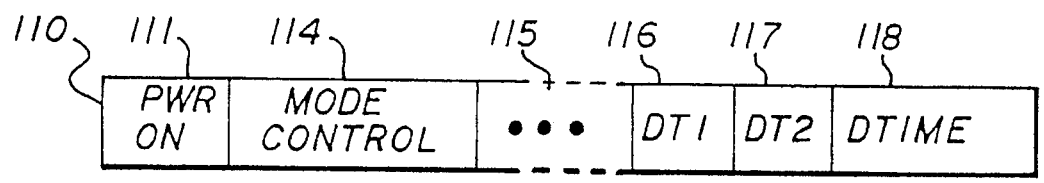
FIG. 6 illustrates the internal data structure within the RAM of the microprocessor the optical drive of the present invention.

FIG. 6 illustrates an internal data structure 110 within the RAM 42 of the microprocessor 40 established by microcode executing out of ROM 41' for implementing the present invention. It is to be understood that the RAM 42 might contain additional data structures for controlling the other operation of the drive. The "PWR-ON" field 111 indicates that power has been turned on but no mode set command has been received. The "mode control" field 114 indicates that a mode set command has been received. The space 115 indicates that additional control bits may be used in the data structure 110. "DT1" is the default temperature for temperature 1. "DT2" is the default temperature for temperature 2 and "DTIME" is the default value for the time delay all stored in RAM 42'.

FIG. 7 is a flow chart which illustrates operations for setting the "mode" controls of the microprocessor 40 of the optical drive 10 of the present invention at power-on or system reset. The machine step 120, which is a part of the system reset 120 and power-on sequence, sets the "PWR-ON" bit to one in structure 110. At machine step 124, the "mode control" 114 is set to zero and DT1, DT2, and DTIME in RAM are set to the default values by microcode executing in microprocessor 40' using code stored in ROM 41'.

FIG. 8 is a second flow chart which illustrates the operation of the optical drive of the present invention. A command is received at machine step 130 from the host processor 37'. At step 132 the microprocessor 40' determines whether the received command is a mode setting command. If a Mode Set command 100 is received, then at machine step 133 the Mode Control bit 114, Temperature T1 103, Temperature T2 104, and Delay Time 105, are stored in RAM 42' in fields Mode Control 114, DT1 116, DT2 117, and DTIME 118 and used for subsequent read, write, erase, and seek commands. Other functions of the Mode Set command are executed in machine step 142 and final status reported in machine step 134.

If a Mode Set command is not received since the machine has been turned on, then the default values of Mode Control 114, DT1 116, DT2 117, and DTIME 118 field stored in RAM at power-on reset or system reset (FIG. 7) are in effect.

If the command is received at machine step 130 from host processor 37' before a Mode Set command has been executed, then at machine step 140 the microprocessor 40' determines the state of the Mode Control Bit. If off, the machine step 141 uses the default values to execute the command in machine step 142 and report final status in machine step 134. If on, the machine step 141B uses the Mode Set values to execute the command in machine step 142 and report final status in machine step 134.

The input to the A/D converter is a voltage which is converted to a digital number. When the temperature changes the digital number changes. The digital number then correlates to a temperature and this data is stored in table form in ROM. The microprocessor then can compare a digital voltage from the A/D converter to the list of digital voltages stored in ROM which relate to a temperature. Knowing the temperatures T1 and T2 the microprocessor can maintain the proper drive temperature.

Thus, the present invention has been described herein with reference to a particular embodiment for a particular application. Those having ordinary skill in the art and access to the present teachings will recognize additional modifications applications and embodiments within the scope thereof. For example, the invention is not limited to be used with optical drives. The invention may be used with numerous systems as will be appreciated by one skilled in the art. Further, the invention is not limited to temperature sensing per se. The invention may be used to regulate other conditions in a device or system. In addition, the invention is not limited to the methods shown for sensing temperature and for regulating the duty cycle of the host device. Many sensor arrangements may be used and many operating modes may be used without departing from the scope of the present invention.

It is therefore intended by the appended claims to cover any and all such applications, modifications and embodiments within the scope of the present invention.

Accordingly,

What is claimed is:

1. In an optical disk drive having a plurality of internal heat-generating devices, a system for dynamically regulating an operating temperature of said drive, comprising:

sensor means for detecting said operating temperature of said drive and producing a sensor output signal representative of said operating temperature and, control means responsive to said sensor output signal for inhibiting operation of at least a selected one but less than all of said internal heat-generating devices when said sensor output signal exceeds a first threshold level.

2. The system as set forth in claim 1 wherein said control means also functions to inhibit operation of at least an additional one of said internal heat-generating devices when said sensor output signal exceeds a second threshold level greater than said first threshold level.

3. The system as set forth in claim 2 wherein said sensor means includes:

a temperature sensor for detecting said operating temperature of said drive and generating an analog output signal representative of said operating temperature and a digital-to-analog converter for converting said analog output signal to a digital temperature value representative of said operating temperature, said digital temperature value comprising said sensor output signal.

4. The system as set forth in claim 3 wherein said control means includes:

a microprocessor programmed to compare said digital temperature value to first and second digital threshold values representative of said first and second threshold levels, respectively, and to inhibit operation of said at least a selected one of said internal heat-generating devices in response to said digital temperature value being greater than said first digital threshold value, and to inhibit operation of said at least an additional one of said internal heat-generating devices in response to said digital temperature value being greater than said second digital threshold value.

5. The system as set forth in claim 4 wherein:

said optical disk drive is interfaced with a host computer and said first and second digital threshold values are adjustable by said host computer.

6. The system as set forth in claim 2 wherein:

said optical disk drive is interfaced with a host computer and said control means includes a microprocessor programmed to execute write, erase, read, and verify commands issued by said host computer and to return command-completion signals to said host computer upon completion of execution of said commands issued by said host computer;

wherein said microprocessor is responsive to said sensor output signal exceeding said first threshold level to delay returning said command-completion signal to said host computer upon completion of execution of a write or erase command, by a first prescribed time period, to thereby allow said disk drive to cool during said first prescribed time period; and wherein said microprocessor is responsive to said second control signal to delay returning said command-completion signal to said host computer upon completion of execution of a read or verify command, by a second prescribed time period, to thereby allow said disk drive to cool during said second prescribed time period.

7. The system as set forth in claim 1 wherein said at least a selected one of said internal heat-generating devices includes a bias coil for producing a magnetic field for effecting a write or erase operation.

8. The system as set forth in claim 7 wherein said at least a selected one of said internal heat-generating devices further includes coarse and fine actuator coils of a positioning and focusing subsystem for focusing and controllably positioning a beam of radiation relative to an information-bearing surface of an optical storage medium.

9. The system as set forth in claim 8 wherein said at least an additional one of said internal heat-generating devices includes a laser.

10. The system as set forth in claim 7 wherein said at least an additional one of said internal heat-generating devices includes coarse and fine actuator coils of a positioning and focusing subsystem for focusing and controllably positioning a beam of radiation relative to an information-bearing surface of an optical storage medium.

11. The system as set forth in claim 7 wherein said at least an additional one of said internal heat-generating devices includes a laser.

12. The system as set forth in claim 11 wherein said at least an additional one of said internal heat-generating devices further includes coarse and fine actuator coils of a positioning and focusing subsystem for focusing and controllably positioning a beam of radiation relative to an information-bearing surface of an optical storage medium.

13. The system as set forth in claim 1 wherein said optical disk drive comprises a magneto-optic optical disk drive.

14. The system as set forth in claim 1 wherein said first threshold level is adjustable.

15. The system as set forth in claim 1 wherein said sensor means includes a first temperature sensor for detecting an ambient air temperature of said drive and a second temperature sensor for detecting a surface temperature of an optical disk loaded in said drive.

16. In a computer peripheral device, a system for dynamically regulating an operating temperature of said device comprising:

sensor means for detecting said operating temperature of said device and producing a sensor output signal representative of said operating temperature and mode changing means for changing a mode of operation of said device from a normal mode of operation to a first heat dissipation mode of operation in which write and erase operations of said device are inhibited, but read and verify operations of said device are not inhibited, in response to said sensor output signal exceeding a first threshold level.

17. The system as set forth in claim 16 wherein said mode changing means is responsive to said sensor output signal exceeding a second threshold level greater than said first threshold level, for changing the mode of operation of said device from said first heat dissipation mode of operation to a second heat dissipation mode of operation in which said write, erase, read and verify operations are inhibited.

18. The system as set forth in claim 17 wherein said sensor means includes:

a temperature sensor for detecting said operating temperature of said drive and generating an analog output signal representative of said operating temperature and a digital-to-analog converter for converting said analog output signal to a digital temperature value representative of said operating temperature, said digital temperature value comprising said sensor output signal.

19. The system as set forth in claim 18 wherein said mode changing means includes:

a microprocessor programmed to compare said digital temperature value to first and second digital threshold values representative of said first and second threshold levels, respectively, and to inhibit said write and erase operations of said drive in response to said digital temperature value being greater than said first digital threshold value, and to inhibit said read and verify operations of said drive in response to said digital temperature value being greater than said second digital threshold value.

20. The system as set forth in claim 19 wherein:

said optical disk drive is interfaced with a host computer and said first and second digital threshold values are adjustable, by said host computer.

21. The system as set forth in claim 20 wherein said first and second threshold levels are adjustable.

22. The system as set forth in claim 17 wherein:

said optical disk drive is interfaced with a host computer and said mode changing means includes a microprocessor programmed to execute write, erase, read, and verify commands issued by said host computer and to return command-completion signals to said host computer upon completion of execution of said commands issued by said host computer;

wherein said microprocessor is responsive to said sensor output signal exceeding said first threshold level to delay returning said command-completion signal to said host computer upon completion of execution of a write or erase command, by a first prescribed time period, to thereby allow said disk drive to cool during said first prescribed time period and wherein said microprocessor is responsive to said second control signal to delay returning said command-completion signal to said host computer upon completion of execution of a read or verify command, by a second prescribed time period, to thereby allow said disk drive to cool during said second prescribed time period.

23. The system as set forth in claim 16 wherein said sensor means includes a first temperature sensor for detecting an ambient air temperature of said drive, and a second temperature sensor for detecting a surface temperature of an optical disk loaded in said drive.

24. In an optical disk drive having a plurality of internal heat-generating devices, a system for dynamically regulating an operating temperature of said drive, comprising:

a sensor for detecting said operating temperature of said drive and producing a sensor output signal representative of said operating temperature and a control system responsive to said sensor output signal for inhibiting operation of at least a selected one but less than all of said internal heat-generating devices when said sensor output signal exceeds a first threshold level.

25. The system as set forth in claim 24 wherein said control system is further responsive to said sensor output signal for inhibiting operation of at least an additional one of said internal heat-generating devices when said sensor output signal exceeds a second threshold level greater than said first threshold level.

26. In a computer peripheral device, a system for dynamically regulating an operating temperature of said device comprising:

a sensor for detecting said operating temperature of said device and producing a sensor output signal representative of said operating temperature and a mode changing system for changing a mode of operation of said device from a normal mode of operation to a first heat dissipation mode of operation in which write and erase operations of said device are inhibited, but read and verify operations of said device are not inhibited, in response to said sensor output signal exceeding a first threshold level.

27. The system as set forth in claim 26 wherein said mode changing system is responsive to said sensor output signal exceeding a second threshold level greater than said first threshold level for changing the mode of operation of said device from said first heat dissipation mode of operation to a second heat dissipation mode of operation in which said write, erase, read and verify operations are inhibited.

28. In a computer peripheral device, a method for dynamically regulating an operating temperature of said device comprising the steps of:

detecting said operating temperature of said device and producing a temperature-indication signal representative of said operating temperature and changing a mode of operation of said device from a normal mode of operation to a first heat dissipation mode of operation in which write and erase operations of said device are inhibited, but read and verify operations of said device are not inhibited, in response to said temperature-indication signal exceeding a first threshold level.

29. The method as set forth in claim 28 further comprising the step of changing the mode of operation of said device from said first heat dissipation mode of operation to a second heat dissipation mode of operation in which said write, erase, read and verify operations are inhibited, in response to said temperature-indication signal exceeding a second threshold level greater than said first threshold level.

30. In an optical disk drive having a plurality of internal heat-generating devices, a method for dynamically regulating an operating temperature of said drive, comprising the steps of:

detecting said operating temperature of said drive and producing a temperature-indication signal representative of said operating temperature; and, inhibiting operation of at least a selected one but less than all of said internal heat-generating devices when said temperature-indication signal exceeds a first threshold level.

31. The method as set forth in claim 30 further comprising the step of inhibiting operation of at least an additional one of said internal heat-generating devices when said temperature-indication signal exceeds a second threshold level greater than said first threshold level.

\* \* \* \* \*